June 19, 1928.
H. H. WILLIAMS
1,674,537
METHOD OF MANUFACTURING SPOKED ARTICLES
Filed Jan. 16, 1926 5 Sheets-Sheet 1
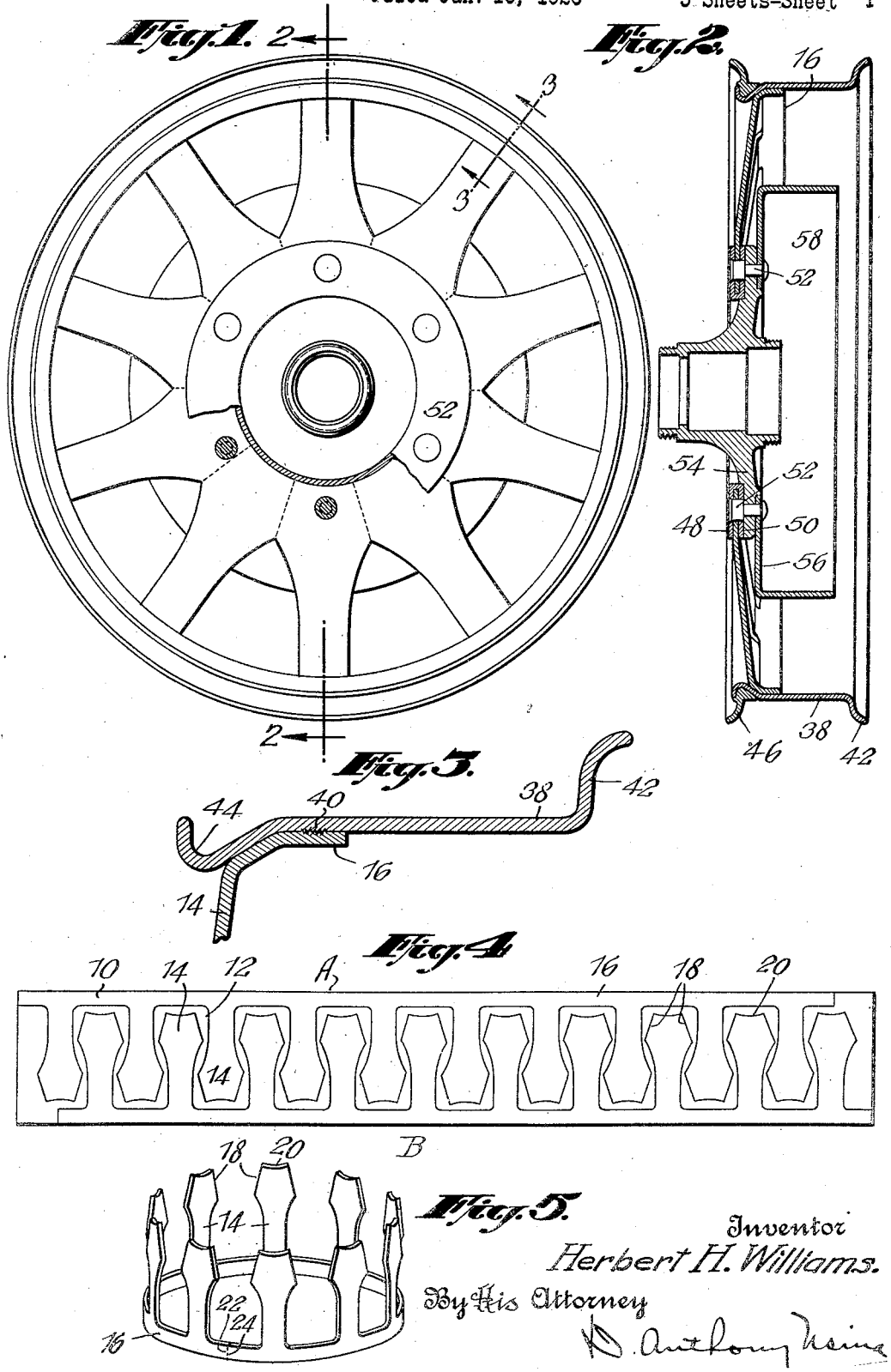
Inventor
Herbert H. Williams.
By His Attorney June 19, 1928.
H. H. WILLIAMS
1,674,537
METHOD OF MANUFACTURING SPOKED ARTICLES
Filed Jan. 16, 1926    5 Sheets-Sheet 2
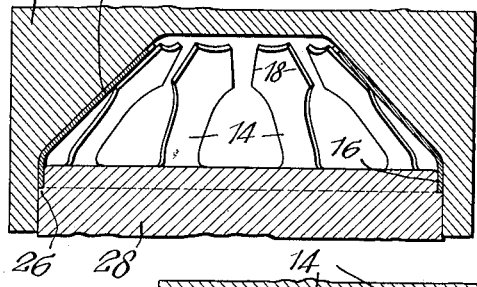
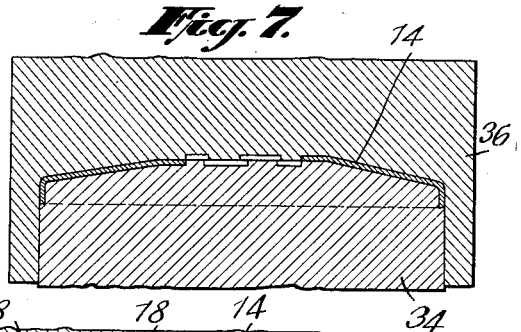
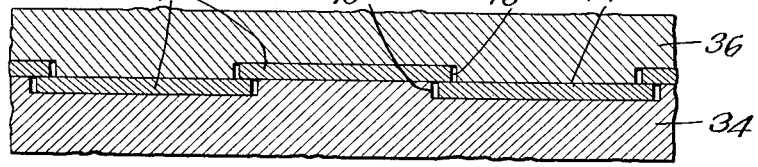
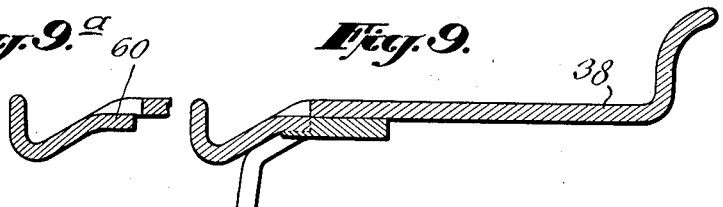
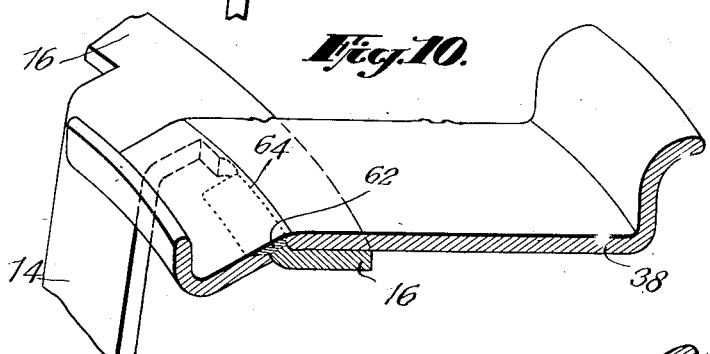
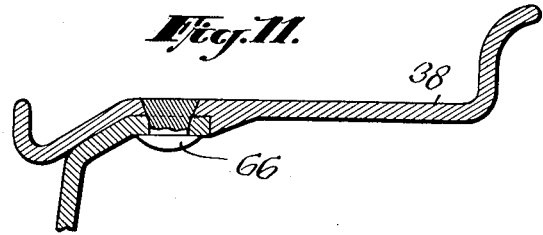
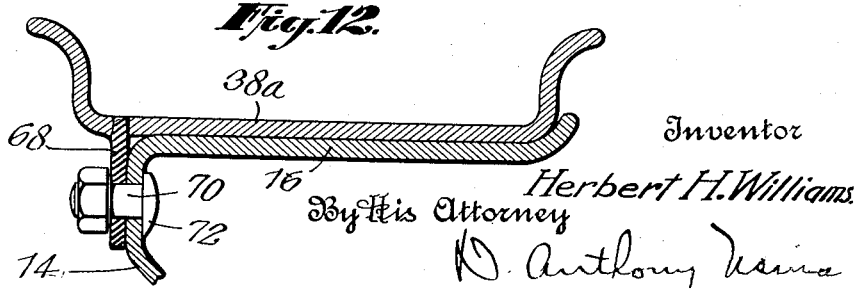
Inventor
Herbert H. Williams
By His Attorney June 19, 1928.
H. H. WILLIAMS
1,674,537
METHOD OF MANUFACTURING SPOKED ARTICLES
Filed Jan. 16, 1926
5 Sheets-Sheet 3
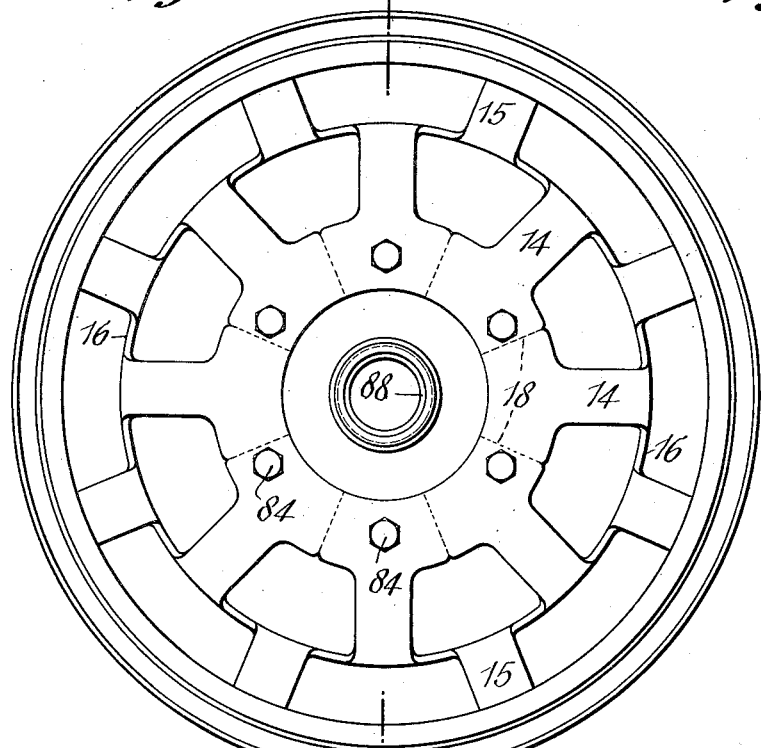
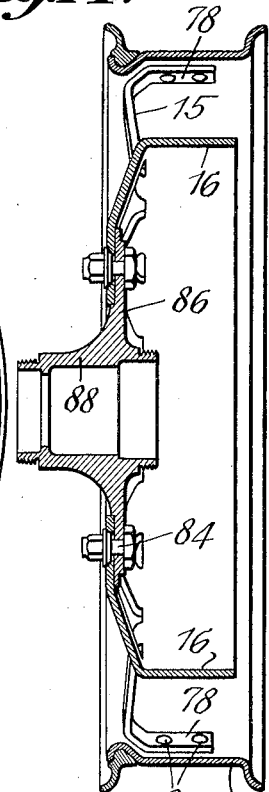
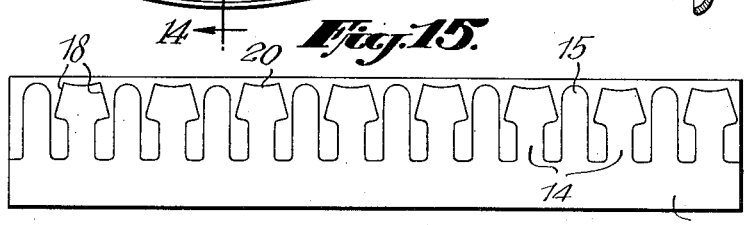
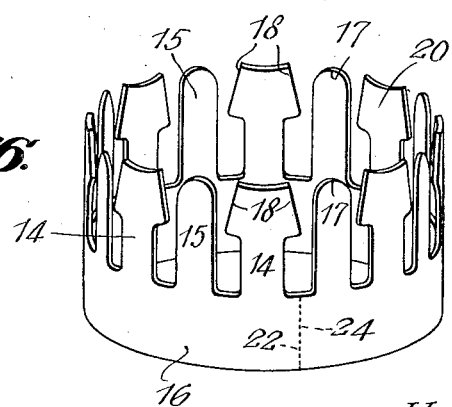
Inventor
Herbert H. Williams.
By His Attorney June 19, 1928.  1,674,537
H. H. WILLIAMS
METHOD OF MANUFACTURING SPOKED ARTICLES
Filed Jan. 16, 1926  5 Sheets-Sheet 4
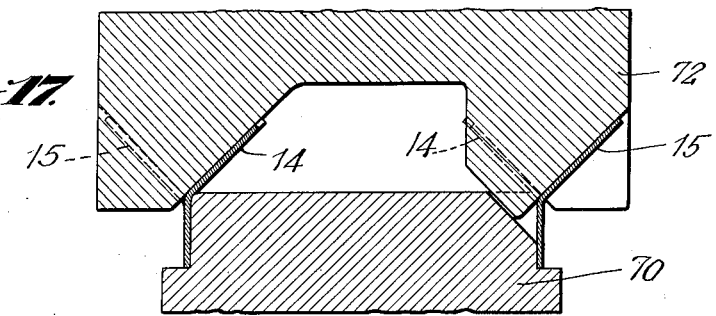
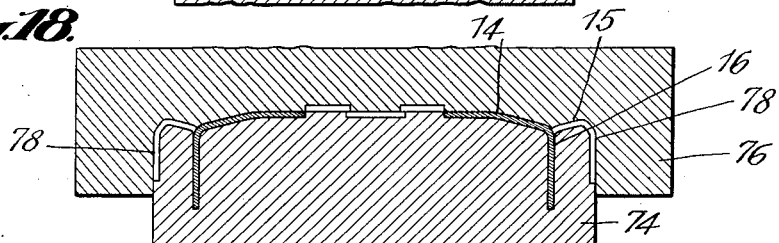
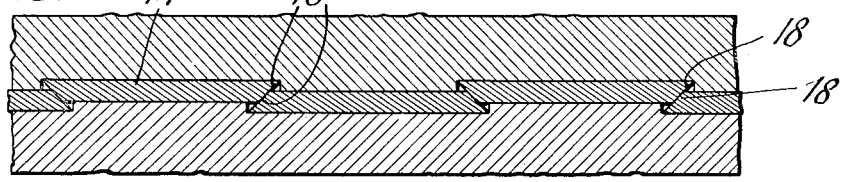
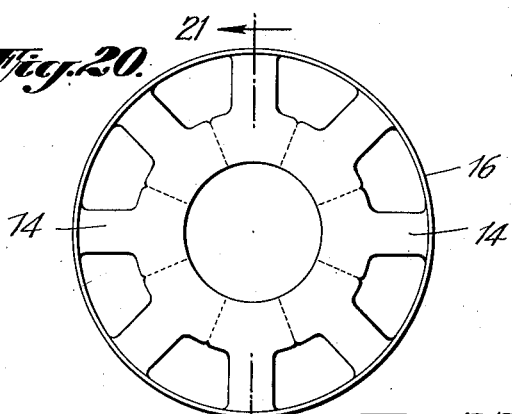
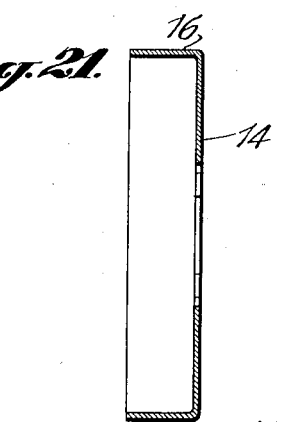
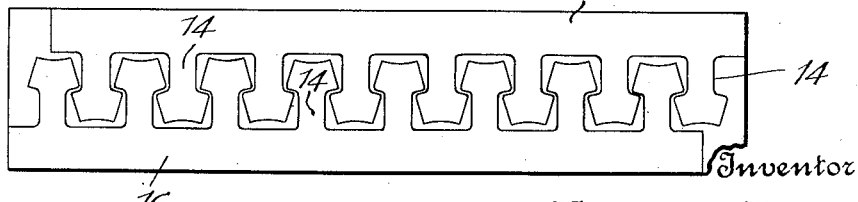
Inventor
Herbert H. Williams.
By His Attorney

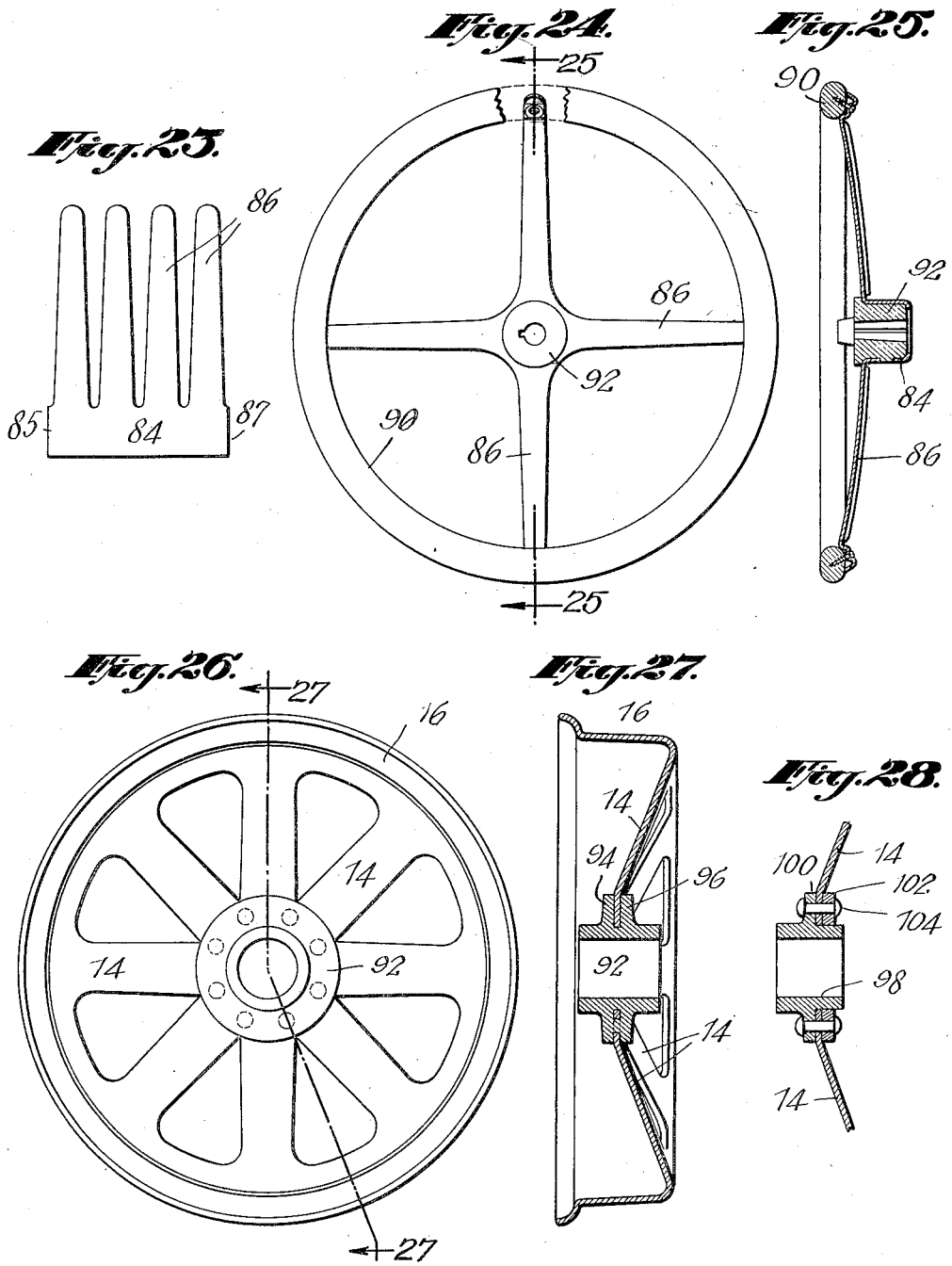

Patented June 19, 1928.

1,674,537

UNITED STATES PATENT OFFICE.

HERBERT H. WILLIAMS, OF BROOKLYN, NEW YORK, ASSIGNOR TO THOMAS E. MURRAY, OF BROOKLYN, NEW YORK.

METHOD OF MANUFACTURING SPOKED ARTICLES.

Application filed January 16, 1926. Serial No. 81,677.

The invention relates to the manufacture of articles such as vehicle wheels and the like and aims to provide improvements whereby production in a given period of time is increased, and also to reduce the amount of material required to produce a given article.

While not limited thereto, the method is peculiarly well adapted for use in the manufacture of automobile wheels, brake drums for automobiles, steering wheels and similar parts.

In order that the invention may be readily understood, a detailed description of the steps followed in manufacturing automobile wheels and the like will be given, reference being had to the accompanying drawings in which:

Fig. 1 is an elevation of an automobile wheel made in accordance with my improved method;

Fig. 2 is a vertical sectional view thereof on line 2—2 of Fig. 1;

Fig. 3 is an enlarged sectional detail on line 3—3 of Fig. 1;

Fig. 4 is a view at a reduced scale illustrating a flat sheet and showing the contour of a pair of blanks adapted to be punched out therefrom;
Fig. 5 is a perspective view illustrating the step in which a punched blank is rolled into substantially cylindrical form;

Fig. 6 diagrammatically illustrates dies for bending the spoke portions of the cylindrical blank illustrated in Fig. 5;

Fig. 7 is a view illustrating a step in the method which follows that shown in Fig. 6;

Fig. 8 is an enlarged developed section showing the overlapped relationship of the nave portions of the wheel spokes;

Figs. 9, 9ª, 10, 11 and 12 are detail sectional views illustrating slightly different connections between the wheel and the rim;

Fig. 13 is a face view of a wheel having a brake drum made according to my improved method and having spoke portions which at the center engage a wheel hub and other spokes extending outwardly from the drum which engage a wheel rim;
Fig. 14 is a sectional view of the wheel taken on line 14—14 of Fig. 13;

Fig. 15 is a plan view at a reduced scale showing a flat sheet of metal from which the brake drum of Figs. 13 and 14 is produced;
Fig. 16 is a perspective view illustrating the blank of Fig. 15 after it has been rolled to substantially cylindrical form;

Fig. 17 illustrates diagrammatically the method of bending one set of spokes of Fig. 16 inwardly and the other set of spokes outwardly;

Fig. 18 illustrates the dies for bending the spokes of Fig. 16 to their final positions;

Fig. 19 is a developed section showing the overlapping relationship of the nave portions of the spokes formed from the blank of Fig. 15;

Fig. 20 is a face view of a brake drum provided only with inwardly extending spokes;

Fig. 21 is a sectional view on line 21—21 of Fig. 20;

Fig. 22 is a view of the flat sheet from which the brake drum of Fig. 20 is blanked out;

Fig. 23 is a view of a blank suitable for forming a spoked article such as a steering wheel or the like;

Fig. 24 is a face view of a steering wheel, the spoked portions of which are formed from the blank of Fig. 23;

Fig. 25 is a sectional view on line 25—25 of Fig. 24;

Fig. 26 is a face view of a wheel in which the spokes are dished and imbedded at their inner ends in a cast hub;

Fig. 27 is a sectional view of the wheel taken on line 27—27 of Fig. 26;

Fig. 28 is a view similar to Fig. 27, showing nave portions of the spoke secured to the hub in a modified manner.

Referring in detail first to Figs. 1 to 8 of the drawings, 10 represents a flat sheet of comparatively thin metal. This sheet is fed to a suitable punch press and the portions 12 between the spokes 14 of the blanks A and B are punched therefrom. Such punching operation will result in forming two blanks. Each blank will have a series of spoke portions 14 and a rim portion 16. The extremities of the spoke portions are preferably enlarged as shown and their edges 18 converge so that when the wheel is formed to its final shape, these edges will point toward the center of the wheel. The extreme end of each spoke portion is curved as at 20 and conforms substantially to a circle concentric with the center of the wheel which is to be produced.

A flat blank A, for example, is rolled into a substantially cylindrical shape as indicated in Fig. 5, and the meeting ends 22 and 24 of the rim portions 16 are welded so as to form an endless ring.

This substantially cylindrical blank of Fig. 5 is then seated on the shoulder 26 of a suitable die such as shown at 28 in Fig. 6. A cooperating die member 30 having an inclined spoke engaging surface 32 moves downwardly and bends the several spoke portions 14 in a direction at an angle to the cylindrical surface of the rim portion 16, as clearly indicated in Fig. 6.

After this preliminary bending of the spokes 14, the blank is subjected to the action of the die members 34 and 36 illustrated in Fig. 7, which bend the spokes to their final position.

The contour and size of the nave portions of the spokes 14 is such that when said spokes are bent to their final position, the nave portions of adjacent spokes overlap as indicated in the developed section of Fig. 8. A welding current is passed through the overlapping nave portions and thus the several nave portions combine to form in effect one integral nave.

To the rim portion 16 of the wheel formed as above described, I may secure various kinds of supplemental rims. For example, as shown in Fig. 3, the supplemental rim 38 is spot-welded as indicated at 40 to the rim portion 16. The supplemental rim 38 is provided with a suitable flange 42 at one side, adapted to engage the lower portion of the so-called straight side automobile shoe. The opposite side of this supplemental rim is formed with an annular depressed seat 44 adapted to receive a tire-holding ring such as indicated at 46 in Fig. 2.

Instead of electrically welding the nave portions of the spokes 16, in some cases I may secure them in place by the use of suitable flanges or rings. For example, in Fig. 2 I have shown the inner ends of the spokes held between plates 48 and 50 by means of a rivet 52 which passes through the flange 54 of a wheel hub and through a suitable opening in the wall 56 of the brake drum 58.

Instead of spot-welding the rim portion 16 of the wheel to the supplemental rim, I may secure in various other ways as illustrated in Figs. 9 to 12.

In Fig. 9 supplemental rim 38 is formed at various points with a suitable welding projection such as indicated at 60 in Fig. 9ª. The passing of a welding current through the parts will unite them as indicated in Fig. 9.

In Fig. 10 the joint between the supplemental rim 38 and the rim portion 16 of the wheel is secured by riveting a projecting portion 62 suitably formed on the rim portion 16 within an aperture indicated in dotted lines at 64 formed in the supplemental rim.

In Fig. 11 the parts as shown are secured to one another by means of a simple rivet 66.

Fig. 12 shows a further alternative arrangement wherein a supplemental rim 38ª of slightly different form is provided with an inwardly extending lug 68 having formed therein a suitable aperture through which passes a bolt 70 having a head 72 which engages the inner face of the spoke 14. In this figure the rim portion 16 of the wheel as illustrated is formed with a much wider face than that shown in the other figures.

My improved method also is useful in forming brake drums for automobile wheels such as illustrated in Figs. 13 and 14. Such brake drums are formed from a flat sheet which is blanked out as shown in Fig. 15, and rolled into substantially cylindrical form illustrated in Fig. 16. This blank comprises a rim portion 16 and hub portions 14 quite similar to those above described, the hub portions at their free ends being formed with converging edges 18. Between the spoke portions 14, however, are provided other spoke portions 15 whose extremities 17 are preferably, though not necessarily, rounded off as shown.

After the ends 22 and 24 of the blank of Fig. 16 have been united, the substantially cylindrical blank is placed on the die block 70 of Fig. 17, and upon the downward movement of the die member 72, the spokes 14 are all bent inwardly toward the center of the wheel. On the other hand, the alternate spokes 15 are bent outwardly. After this preliminary forming, the blank is then subjected to further action between the die members 74 and 76 and the parts are pressed to the final shape as clearly indicated in Fig. 18. This final forming operation brings the nave portions of the spokes 14 into overlapping relationship as indicated in the developed section of Fig. 19. A welding current is then passed through the nave portions of the spokes so as to unite the adjacent spokes into a substantially integral structure at the nave. The brake drum as thus formed is provided with feet indicated at 78 in Fig. 14, which are suitably secured as by rivets 80 to a suitable supplemental rim 82. The nave portions of the spokes are provided with suitable apertures through which bolts 84 are passed so as to secure the spokes to the flange 86 of the wheel hub 88. It is thus clear that the rim portion 16 forms the brake drum for the wheel illustrated in Fig. 14.

My method is also useful in producing spoked articles such as the brake drum illustrated in Figs. 20 and 21, comprising the cylindrical rim portion 16 and spoke portions 14, the inner ends of which combine to form a sort of hub or nave portion. Fig. 22 illustrates the blank for which the brake drum of Fig. 20 is produced.

It is also proposed to make other spoked articles according to my improved method, such as steering wheels or the like illustrated in Figs. 23 to 25. Fig. 23 shows a blank suitable for the production of hub and spoke portions of a steering wheel as shown in Figs. 24 and 25.

The blank of Fig. 23 is formed from a flat sheet and includes a hub or sleeve portion 84 and spoke portions 86. The blank of Fig. 23 is rolled into substantially cylindrical shape and the ends 85 and 87 are welded or otherwise united. The spokes 86 are then bent outwardly. These spokes may be bent as at 88 so as to neatly engage the hand or grip rim 90 of the steering wheel. The sleeve portion 84 is preferably secured to a cast hub as indicated at 92 in Fig. 25.

In Figs. 26 and 27 I have illustrated a slightly different type of wheel in which a hub 92 of iron or other suitable metal is cast permanently around the nave portion of the spokes, this hub being formed with integral flanges 94 and 96 embracing the opposite faces of the nave portion of the spokes.

Fig. 28 shows a slight modification of the construction of Fig. 27, in which a hub 98 is provided with a flange 100 against which the nave portions of the spokes are seated. In this construction a ring 102 engages the opposite face of the spokes and the parts are securely held in assembled relationship by means of a suitable fastening device such as a rivet 104 or its equivalent.

In the manufacture of parts such as automobile wheels, brake drums, steering wheels and the like, it is highly desirable to use high carbon or alloy steels in order to secure the required rigidity, strength and wearing qualities. Such steels do not draw or form readily, and in methods heretofore proposed it has been necessary to heat the stock and perform the operations while the stock was at a high heat in order to accomplish the desired results.

By the improved method above described, the drawing operations are practically eliminated and the rolling and bending operations described are performed on cold stock. This results in considerable saving of time and expense and has the advantage that the cold stock can, of course, be very easily handled.

A further saving is effected because of the fact that the method described permits of so designing and blanking the spokes that they may be staggered on the sheet, thus reducing to a minimum the amount of waste material. This saving in waste material may be as high as 40% of that required to produce the given article by the usual method. To illustrate by a specific example: To make the wheel blank illustrated in Fig. 5 by the ordinary method heretofore in use, from one piece of metal one would require a sheet 24 inches square having an area of 576 square inches. On the other hand, when made according to my improved method, a rectangular sheet laid out according to Fig. 4 containing 724 square inches of metal will produce two blanks such as shown in Fig. 5. In other words, according to my method, each blank requires 362 square inches against the 576 required by former methods. Hence, my method enables the saving in material of about 37%.

While I have described with great particularity certain definite steps in my method and specific articles produced thereby, it is not to be construed that I am limited hereto since various modifications may be made by those skilled in the art without departing from the invention as defined in the appended claims:

What I claim is:

1. In the manufacture of spoked articles the method which consists in punching a flat sheet to form a blank having a series of spokes, rolling the blank into substantially cylindrical shape and bending the spokes at an angle to the cylindrical surface.

2. In the manufacture of spoked articles the method which consists in punching a flat sheet to form a blank having a series of spokes, rolling the blank into substantially cylindrical shape and uniting the ends thereof and bending the spokes at an angle to the cylindrical surface.

3. In the manufacture of spoked articles the method which consists in punching a flat sheet to form a blank having a series of spokes, rolling the blank into substantially cylindrical shape and bending the spokes at an angle to the cylindrical surface and securing the ends of said spokes in place.

4. In the manufacture of spoked articles the method which consists in punching a flat sheet to form a blank having a series of spokes, bending the blank as a whole and uniting the ends thereof and bending the spokes substantially at right angles and securing the ends thereof in place.

5. In the manufacture of spoked wheels the method which consists in providing a flat sheet having a series of spoke portions changing said flat sheet to substantially cylindrical form, bending the spoke portions at an angle to the cylindrical surface and securing the ends of said spoke portions in position.

6. In the manufacture of spoked wheels the method which consists in providing a flat sheet having a series of spoke portions changing said flat sheet to substantially cylindrical form, bending the spoke portions radially inward and securing the ends thereof.

7. In the manufacture of wheels the method which consists in blanking out a flat sheet to form spoke and rim portions, rolling the blank so that both the spoke and rim portions lie in a substantially cylindrical plane, uniting the ends of the rim portion and bending the spoke portions so that they lie in a plane at an angle to the cylindrical surface.

8. In the manufacture of wheels the method which consists in blanking out a flat sheet to form spoke and rim portions, rolling the blank so that both the spoke and rim portions lie in a substantially cylindrical plane, uniting the ends of the rim portion bending the spoke portions substantially at right angle and securing the ends thereof.

9. In the manufacture of wheels the method which consists in blanking out a flat sheet to form spoke and rim portions, rolling the blank so that both the spoke and rim portions lie in a substantially cylindrical plane, welding the ends of the rim portion, bending the spoke portions radially inward and uniting adjacent spoke portions near their inner ends.

10. In the manufacture of wheels the method which consists in punching out a flat sheet to form a blank having rim and spoke portions, changing said blank from flat to cylindrical form and uniting the meeting edges of the rim portion, bending over the spoke portions so that the nave ends thereof slightly overlap, and welding the adjacent nave portions together.

11. In the manufacture of wheels the method which consists in punching out a flat sheet to form a blank having rim and spoke portions, changing said blank from flat to cylindrical form and uniting the meeting edges of the rim portion, bending over the spoke portions so that the nave ends thereof slightly overlap, and passing a welding current through the overlapping nave portions.

In witness whereof, I have hereunto signed my name.

HERBERT H. WILLIAMS.